Patented Mar. 12, 1940

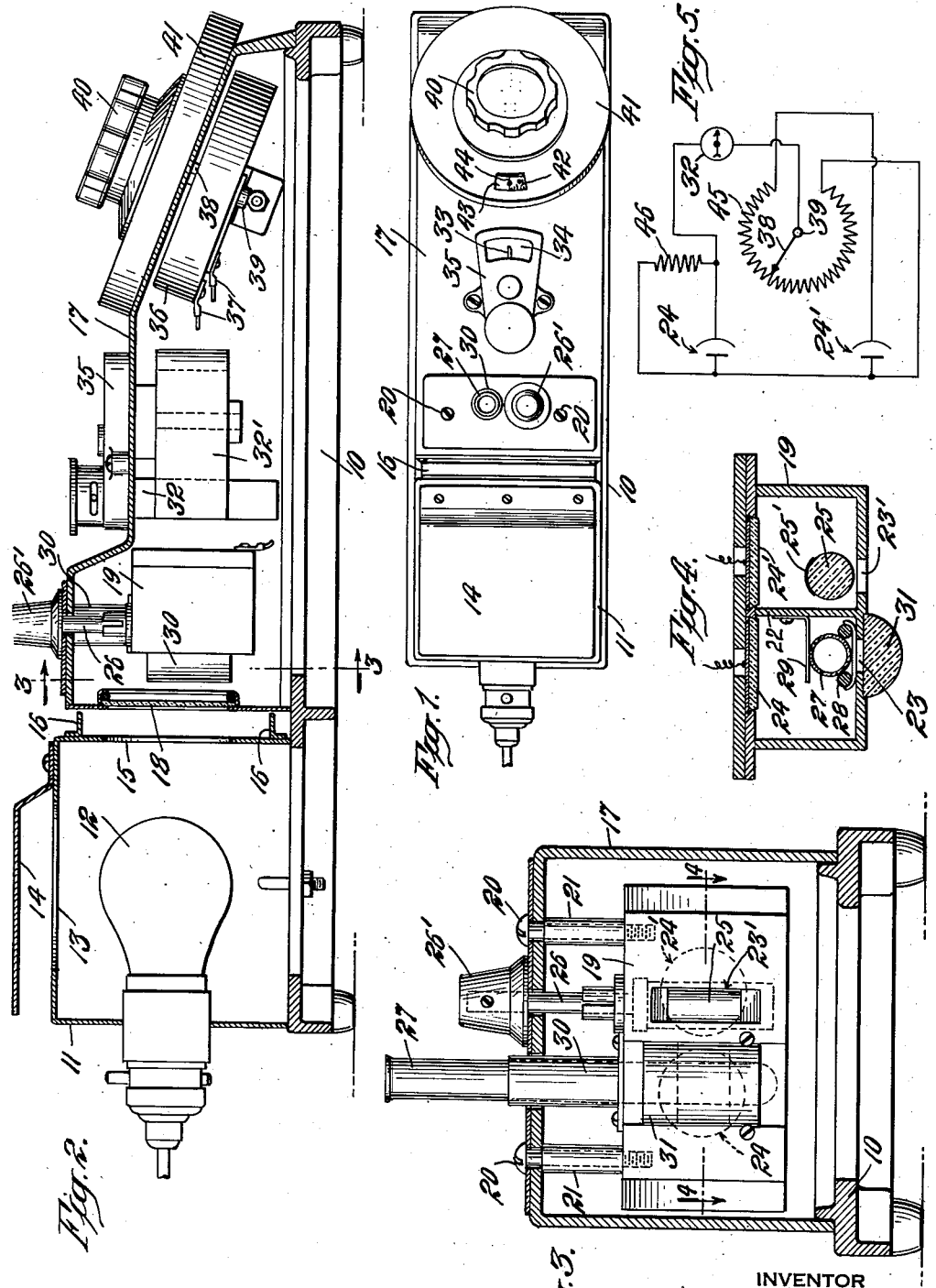

2,193,437

UNITED STATES PATENT OFFICE 2,193,437

COLORIMETER

William H. Summerson, Jackson Heights, N. Y.

Application July 14, 1938, Serial No. 219,169

1 Claim. (Cl. 88—14)

This improvement relates to colorimeters of the type wherein the relative color intensity of fluids may be determined.

One object of the invention is to produce an improved form of colorimeter of comparatively simple and compact construction and to avoid the necessity of expensive or cumbersome accessories. Another object is to produce such a device wherein the number of adjustments necessary is reduced to a minimum and wherein a single adjustment is sufficient for bringing the instrument into condition for operation. Another object is to produce a form of apparatus which is adapted for rapid and serial measurement of color intensity of a large number of fluids. Another object is to utilize a balanced relationship in the measurements so that in the results various possible relative sources of errors are eliminated. Another object is to enable inexperienced users to obtain results as accurately and as rapidly as when used by an expert. Another object is to utilize a single light source, such as an electric light bulb operable from any electric light circuit, without the necessity of using storage batteries or constant current regulators and the like, and to avoid the use of expensive electrical, mechanical and optical parts, while maintaining a high degree of accuracy in measurement. Various other objects and advantages will be understood from the following description and accompanying drawing illustrating a preferred embodiment thereof.

Fig. 1 is a plan view of the complete apparatus; Fig. 2 is an enlarged vertical longitudinal section; Fig. 3 is a section on the line 3—3 of Fig. 2 looking in the direction of the arrows; Fig. 4 is a horizontal section on the line 4—4 of Fig. 3 looking downwardly; and Fig. 5 is a diagram of connections.

The instrument is shown as having a base 10 on which is mounted a rectangular casing 11 at one end which contains a source of light such as an electric bulb 12. An opening 13 in the top of the casing permits the dissipation of heat and is covered by a plate or shield 14 spaced above the opening. The end of the casing 11 opposite the end of the light bulb 12 is provided with a circular opening 15 for the passage of the light rays to the instrument; and upper and lower strips 16 are secured to the casing 11 above and below the opening 15 for providing an opening in which may be inserted, when desired, holders containing glass screens for suitably modifying the spectral qualities of the light. The remaining portion of the apparatus is enclosed by another casing 17 mounted on the base and extending from the shields 16 to the opposite end of the instrument. In the end of this casing opposite the opening 15 is mounted a ground glass plate 18 through which the light from the source passes, the opening covered by this plate being preferably of the same size as the opening 15.

A unit 19 is mounted opposite the plate 18 and is supported from the top of the casing by screws 20 which pass downwardly through spacing tubes 21 and engage the unit 19, as well shown in Fig. 3. This unit, as shown in Fig. 4, is in the form of a closed rectangular box with a central vertical partition 22. Each compartment of this unit is provided with vertically extending rectangular openings, 23, 23' opposite the ground glass plate 18 for receiving and transmitting light from the source to a pair of flat photoelectric cells 24, 24' mounted respectively on the rear of the two compartments of the unit 19.

In the path of the light rays from the opening 23' to the cell 24' is mounted a cylindrical glass rod 25 having a vertical axis and positioned so that all light passing through the opening 23' and striking the cell 24' will pass through the rod 25. A portion of the surface of this rod is etched as indicated at 25'. The rod is supported by a vertical extension or shaft 26 which extends vertically up through an opening in the casing, as shown in Fig. 3. On the upper end of this shaft is secured a knob 26' by means of which the glass rod 25 may be rotated manually on its vertical axis. It is apparent that rotation of the knob will bring more or less of the etched surface 25' in the path of the light from the opening 23' to the cell 24' which thereby serves as a means for refined adjustment of the amount of light striking the cell 24'. Any other suitable means for adjusting the amount of this light may be used, such as adjusting the size of the opening 23' with a variable shutter.

In the compartment at the opposite side of the partition 22 and in the path of the light rays through the opening 23 to the cell 24, there is located a removable glass test tube 27 of standard size and form adapted to receive the fluid to be examined in the colorimeter. The tube is supported in position by a pair of vertically extending guide rods 28 positioned at opposite sides of the opening 23 and by a spring clip 29 secured to the partition 22 and yieldably engaging the tube 27. This spring clip is located above the top of the opening 23 so as not to be in the path of the light rays. A cylinder 30 is secured to the top of the unit 19 and extends upwardly through the top of the casing 17 for guiding and holding the tube 27 in proper position. The lower end of the test tube extends below the opening 23 so as not to be in the path of the light rays. The cylindrical form of the tube and the fluid within it to be tested acts like a lens in changing the direction of the light rays in their passage from the opening 23 to the cell 24 and in order to compensate for such effect, a convex cylindrical lens 31 is positioned in front of the opening 23. The use of a standard test tube, instead of a special glass optical cell for containing the fluid to be tested has the advantage of being easily obtainable and replaceable at low cost, besides being convenient in use and easy to clean. In the particular instrument shown, a standard test tube of one-half inch in diameter is used but the instrument could be adapted to receive any other standard size of test tube. The tube described likewise fits into a standard brass centrifuge tube and centrifuged specimens may be tested directly in the test tubes, as the curved bottom of the test tube is not in the light path when the tube is in place in the colorimeter. Colorimetry depending on extraction into a non-aqueous solvent is likewise easily carried out using these test tubes, as it is not necessary to remove the colored layer from the tube but merely to adjust the colored layer so that it is in the light path when the tube is placed in the colorimeter.

Within the casing 17 and positioned beyond the unit 19 is a galvanometer 32 having a permanent magnet 32' secured to the underside of the casing 17. This galvanometer may be of inexpensive form as it is a zero reading instrument under balanced testing conditions. The staff of this instrument extends upwardly through the casing 17 and carries a movable needle 33 which swings over a zero reading plate 34 exposed to view through an opening in the casing 35 which encloses the upper portion of the movable system of the galvanometer.

Beyond the galvanometer is located a potentiometer 36 having its resistive element, of about 400 ohms in this instance, wound over the entire surface of a circular ring and having the ends of the resistive conductor connected to terminals 37. The turns of the winding of this potentiometer are carefully and similarly wound and spaced, their top surfaces being engaged by a contact arm 38 carried by a shaft 39. At the outer end of this shaft and outside the casing 17 is secured a knob 40 for manual adjustment of the contact arm 38. Between the knob 40 and the casing 17 is located a circular casing 41 which encloses a circular scale plate 42 which is secured to the shaft of the potentiometer. An aperture covered by a glass plate 43 is provided in the casing 41 located near its outer periphery. The glass plate 43 has a radial extending line 44 across the middle of it for use as a reference point in reading the scale 42. In the present instance the scale is divided into three hundred divisions and when the zero point of the scale is opposite the mark 44, the entire resistance of the potentiometer is in galvanometric circuit. When the knob 40 and scale 42 are turned almost 360° to bring the three hundredth division of the scale opposite the mark 44, all of the potentiometer resistance is cut out of circuit.

Fig. 5 shows the diagram of connections. The two photoelectric cells 24 and 24' are shown having a pair of terminals of like polarity connected together. The remaining terminal of the cell 24' is connected to one terminal of the potentiometer resistance 45, the other terminal of this resistance being connected to the opposite terminal of the cell 24'. The circuit from the terminals of the cell 24 includes a fixed resistance 46 which may be in the form of a small enameled tubular resistive unit and in the particular instrument described, this unit has a resistance of about 400 ohms. Although the value of this fixed resistance may be quite different from that of the potentiometer resistance, the best results are obtained when these resistances are of about the same value. The contact arm 38 of the potentiometer is electrically connected to one terminal of the galvanometer 32 already described, the other terminal thereof being connected to one end of the resistance 46 and the terminal of the cell 24 which does not have the common connection with the cell 24', the other end of the resistance 46 being connected to the other terminal of the cell 24. It is evident that the drop in volts in the resistance 46 is dependent upon the current output of the cell 24 and similarly the drop in volts in the potentiometer resistance 45 is dependent upon the current output of the cell 24'.

The foregoing described relationship of parts attains important advantages in this form of colorimeter in the simplicity of adjustment and in the dependability, stability and accuracy of measurements. By the use of a fixed resistance of comparatively high resistance connected across one of the photoelectric cells, the use of a potentiometer of a correspondingly high resistance is made possible connected across the other cell, instead of requiring a potentiometer of relatively low resistance compared with the internal resistance of the photoelectric cell. The use of comparatively high resistances in the circuits of the respective cells tends to minimize errors arising from the fact that the internal resistance of these photoelectric cells varies with the amount of light to which they are subjected. However, this variation in the comparatively small internal resistance of the cells under different measurement conditions is made comparatively negligible in its effect owing to the high resistance in the external circuits of these cells. Furthermore, each high resistance in the circuit of each cell remains unchanged and is permanent under all conditions because the adjustable contact 38 merely brings the potential at the point of contact with resistance 45 to the same potential as that at the terminal of resistance 46 which is connected to the galvanometer, without any change of the amount of resistance 45 in series with the cell 24'. This constancy of the resistance in the circuit of each cell under all conditions of measurement, together with the avoidance of a number of variable electrical contacts still further contributes to the extreme degree of stability in adjustment which the instrument possesses.

In order to prepare the apparatus for use, only a single adjustment is necessary. For this purpose the switch of the light bulb 12 is closed for producing the source of light. A test tube 27 is then filled with a colorless fluid, such as pure water and inserted in the position shown. The light entering the opening 23 is then forced to pass through the fluid and tube 27 before it strikes the photoelectric cell 24. This light, thus modified by the presence of the colorless fluid, causes the production of an electromotive force by the cell 24 and causes a current to pass through the resistance 46. The potentiometer is brought to a position so as to give a zero reading on the scale plate 42. The knob 26' then is turned until the galvanometer reading is brought to zero. By this adjustment the amount of light which is permitted to pass through the opening 23' to the cell 24' is brought to such an amount that with pure or distilled water in the test tube, the scale reading of the potentiometer is zero.

The colorless fluid in the tube 27 then is replaced by the solution to be examined. This may be done by removing the colorless fluid from the tube 27 and, after drying, placing the colored fluid in the same container, or the colored fluid may be already at hand in a second test tube which has previously been found to be identical physically and optically with the first tube, so that the change from one glass tube to the other introduces no source of error on account of using different tubes.

When the tube and the fluid now under examination are placed in the colorimeter, their influence on the intensity of the light striking the cell 24 will be evidenced by a decrease in the current output of this cell as compared to the current when the colorless fluid was in the colorimeter. This condition occurs because the current output of a photoelectric cell is a function of the intensity of the light striking its surface, and it may be taken as a general fact, that the light transmission of a colored or turbid solution is less than that of a colorless solvent. The decrease in the current from cell 24, as compared with its original value, will destroy the electrical balance in the galvanometer circuit, and current will flow through the galvanometer as evidenced by the movement of the galvanometer needle away from its zero position. Movement of the potentiometer contact arm by the knob 40 to a proper position will, however, bring the galvanometer needle back to its zero position, indicating a restoration of the electrical balance in the galvanometer circuit. The reading of the potentiometer scale at this point is a measure of the colored solution.

It will be appreciated that the light absorbing properties of the colored solution placed in the colorimeter are not directly measured, but the procedure gives a determination of the amount of light passed through it compared with that passed through the colorless fluid or solution. The initial adjustment of the knob 26' in controlling the amount of light permitted to strike the cell 24' compensates for various factors so as to remove their effects upon the accuracy of the apparatus. For example, the glass solution container of circular cross-section introduces a lens effect, altering the path of the light rays as previously mentioned and affects the output of the cell without a change of intensity of the light, and this effect may not be completely overcome by the compensating lens 31. Further influences affecting the transmission of light are the factors of the reflection of light from the sides of the glass tube, as well as the influence of the glass itself on the absorption or scattering of light rays. These various factors influence the photoelectric cell and affect its current output independently of the effect of the solution under examination on the intensity of the light striking the cell 24. Since it is only the light absorbing effect of the solution which it is desired to evaluate, these modifying factors must be compensated for and kept constant from one measurement to the next. This is accomplished by the preliminary adjustment of the amount of light permitted to strike the cell 24' as by means of turning the glass rod 25, or altering the size of the opening 23', or otherwise. In some cases the size of the opening 23 may be adjusted, or in other ways adjustment of the amount of light striking the cell 24 may be made. After this adjustment and after the initial colorless fluid is replaced by a fluid to be subjected to test, the only factor which varies under these conditions is the light absorbing power of the solution under test; and therefore the scale readings will be a satisfactory measure of the relative light absorbing power, or color, of the two fluids. It is preferable to make the size of the opening 23' a little larger than the size of the opening 23 so that there will be a sufficient amount of light entering the opening 23' to permit it to be cut down by adjustment of the rod 25 for securing a balanced condition in the initial adjustment, as above described. Instead of using a colorless solution in the initial adjustment for evaluating the light absorbing power of the solution under test relatively to that of the colorless fluid, it is evident that color measurements could be carried out in a manner similar to that already described but wherein one colored solution is evaluated in terms of its light absorbing power relatively to that of another colored fluid instead of that of a colorless fluid.

In order to convert the potentiometer readings into a measure of the concentration of the substance under examination, a calibration curve or table must be prepared by plotting the potentiometer readings of a series of solutions of known and different concentrations of the substance being determined so that the potentiometer readings may be interpolated to show the concentration of the unknown solution.

The excellent results obtainable with the particular colorimeter above described may be seen from the fact that in blood hemoglobin determination by the acid hematin method, at a 1:251 dilution of the blood, one scale division (the inherent precision of the instrument) corresponds to less than 0.2 gm. of hemoglobin per 100 cc. of blood. These results are typical of many that have been obtained with this instrument in a number of different analytical procedures, and represent a degree of performance which is superior to results heretofore obtainable with prior colorimeters of this general type.

The satisfactory performance of this instrument is doubtless due in no small part to the provision of two photoelectric cell compartments adjoining each other. This permits the utilization of a common light path for the two cells. This minimizes the effects of environmental temperature differences between the two photoelectric cells in altering their relative electrical properties, and further tends to insure that physical factors tending to affect the light from the light source will influence the two cells equally. Furthermore, a common path of relatively small cross section permits the use of a single glass filter of conventional dimensions, instead of two filters, one for each cell.

It is apparent that by means of this improvement a colorimeter of comparatively small size and light weight is produced which is simple in construction and in the number of parts required and that the cost of various expensive auxiliaries is avoided. The various sources of error are neutralized and compensated for in a simple manner, and by using a single light source, any variations in the intensity thereof affects both photoelectric cells correspondingly and thereby avoids any appreciable error due to variations in the light source. The apparatus is likewise of the utmost simplicity in the required adjustment and permits rapid measurements in a convenient manner and the securing of good results by any user after a few minutes of instruction.

Although a particular embodiment of the invention has been described, it will be understood that various modifications may be made therein without departing from the scope of the invention.

I claim:

A colorimeter comprising a single source of light, a casing having an opening for receiving light from said source, a unitary device within said casing, said device comprising a pair of compartments adjoining each other, each of said compartments having an opening for receiving light from said first named opening, a photoelectric cell in each of said compartments positioned to receive light from the respective openings of said compartments, a receptacle for containing the media to be examined located in the path of the light from one of said compartment openings to one of said cells, said casing having an opening in its top portion above the compartment in which said receptacle is located, said receptacle being removable from its compartment through said opening in the casing, means for adjusting the amount of light transmitted from the other compartment opening to its respective cell, a galvanometer within said casing, an adjustable resistance, a fixed resistance, and means comprising connections between said cells, galvanometer and resistances for indicating the relative effect of the light striking said cells.

WILLIAM H. SUMMERSON.